United States Patent
Montgomery

(10) Patent No.: US 7,050,583 B2
(45) Date of Patent: May 23, 2006

(54) METHOD AND APPARATUS FOR STREAMING DATA USING ROTATING CRYPTOGRAPHIC KEYS

(75) Inventor: Dennis L. Montgomery, Reno, NV (US)

(73) Assignee: Etreppid Technologies, LLC, Reno, NV (US)

( * ) Notice: Subject to any disclaimer, the term of this patent is extended or adjusted under 35 U.S.C. 154(b) by 1012 days.

(21) Appl. No.: 09/823,278

(22) Filed: Mar. 29, 2001

(65) Prior Publication Data

US 2002/0141590 A1   Oct. 3, 2002

(51) Int. Cl.
*H04K 1/06*   (2006.01)
(52) U.S. Cl. .................. 380/37; 380/217; 380/239; 380/269; 380/43; 380/201; 713/160; 705/57
(58) Field of Classification Search .............. 380/217, 380/239, 269, 37, 43, 201; 705/57; 713/160
See application file for complete search history.

(56) References Cited

U.S. PATENT DOCUMENTS 5,341,427 A   8/1994   Hardy et al. ................ 380/21
6,021,391 A   2/2000   Shyu ........................... 705/1

FOREIGN PATENT DOCUMENTS

| EP | 0 676 876 | 10/1995 |
| EP | 1 032 159 | 8/2000 |
| EP | 1032159 A2 * | 8/2000 |

* cited by examiner

*Primary Examiner*—Emmanual L. Moise
*Assistant Examiner*—Paul E. Callahan
(74) *Attorney, Agent, or Firm*—Pillsbury Winthrop Shaw Pittman LLP

(57) ABSTRACT

A method of producing a stream of digital data. The method includes determining a plurality of portions within the stream of digital data, such that a portion of the stream of digital data is encrypted with an encryption key that is capable of being decrypted by a decryption key and the portion including therein another decryption key capable of decrypting a subsequent portion of the stream of digital data, and the subsequent portion of the stream of digital data is encrypted with another encryption key that is capable of being decrypted by the another decryption key. The method also includes transmitting the stream of digital data, including the portion and the subsequent portion.

55 Claims, 9 Drawing Sheets

| Operating System (Windows, Linux) | Device Drivers (Disk, Tape, Display) | Conventional Software (Word, Autocad, E-mail, Internet Explorer) | Data Encoder (Zip, LZW, Windows Media Encoder) | Data Encrypter | Data Streamer (Windows Media Player, Internet Explorer) | Data Transport (Internet, VPN) |

Fig. 3

| Operating System (Windows, Linux) | Device Drivers (Disk, Tape, Display) | Conventional Software (Word, Autocad, E-mail, Internet Explorer) | Data Encoder (Zip, LZW, Windows Media Encoder) | Data Encrypter | Data Streamer (Windows Media Player, Internet Explorer) | Data Transport (Internet, VPN) |
|---|---|---|---|---|---|---|

Fig. 4

METHOD AND APPARATUS FOR STREAMING DATA USING ROTATING CRYPTOGRAPHIC KEYS

FIELD OF THE INVENTION

The present invention relates a method and apparatus for streaming data using rotating cryptographic keys.

BACKGROUND OF THE RELATED ART

The use of encryption is well known. Various encryption algorithms are well known which the capacity to encrypt data, which encrypted data can then be safely transmitted to a secure destination location, whereupon it can then be decrypted to obtain back the original data.

Encryption of digital data is also well known, and what is known as a "key," which is a secret sequence of bits, is used to encrypt the digital data. That same key, or version of it, can then be transferred to the secure destination and used to decrypt the data that has been transmitted after it has been encrypted using a corresponding decryption key.

Separate and distinct from encryption is the streaming transmission and reproduction of a sequence of related digital data, also called an event herein. Any sequence of digital data, whether that data is part of a lossless or lossy transmission, can be considered to make up an event. Examples of the results of typical events are movies having sequences of visual images with or without continuously changing audible sounds and songs with continuously changing audible songs. Continuous events, such as a stream of text data that changes frequently, stock market quotes for example, are also possible. Standards such as MPEG have been developed so that devices which receive the streaming transmissions, typically an end-users computer, can recognized the type of sequence of digital data and use it to reproduce the desired images, sounds, effects or the like.

With respect to the streaming transmission of the digital data content that makes up any such type of event, security challenges have become ever more apparent. In particular, due to the ease with which digital data can be copied and reproduced to thousands if not millions of persons, systems which provide security on the content have been introduced in order to prevent replication. Further, since the stream of data will exist for potentially a lengthy period of time, if an unauthorized user can study an initial part of the entire stream and determine the security measures taken to prevent unauthorized access, that unauthorized user can potentially gain unauthorized access to the remainder of the event, which can be damaging. For instance, if during the first five minutes of a movie, during which time commercials are being transmitted, determine the security measures taken to prevent unauthorized access, that unauthorized user can potentially gain unauthorized access to the entire movie that will be shown thereafter.

Another challenge has been the bandwidth required in order to both transmit digital data and then reproduce from the transmitted digital data sufficient content in order to make the event experience realistic and appealing. Accordingly, in contrast to the transmission of a single document or single image, which can then be reproduced at any speed and then viewed, the temporal aspect inherent in the event experience must be considered. As a result of this aspect, compression techniques are typically used in order to effectively stream more content on a per-transmission unit basis.

Taking into consideration all of these issues result in complex schemes to ensure both the quality of the reproduced event and security of the transmission.

In the context of digital cellular phones, for instance, a sequence of obtained digital data, which represents the spoken voice for that period corresponding to the sequence, is typically encoded with a rotating pseudorandom number. As time progresses, the pseudorandom number changes, with there being a correlation to the rotation of the pseudorandom number and the time that has elapsed. If this scheme is looked at from the perspective of encryption, that pseudorandom number is a single key, since once that key is determined, transmissions which occur thereafter can potentially be determined. The fact that it will take time to determine where in the rotational sequence the pseudorandom number is does not change that characteristic of such a system.

Further, conventionally, when audio and video are streamed from a server to an end-user computer there may be password protection and other registration procedures to verify that the entity receiving and reproducing the transmission is authorized. There may also be codes embedded in the digital data which only allow that digital data to be reproduced on a certain type of player, or even more specifically on a specific player of a certain type. While this can prevent unauthorized access to some extent, the digital data that makes up the event is, in most instances, non-encrypted. And if encryption exists, that encryption is provided based upon a key that resides at the end-user computer. Accordingly, such as system can be tampered with, particularly to the sophisticated-hacker.

Also, encryption of streamed digital data is also performed in order to secure it. Thus, when being reproduced, that digital data will need to be decrypted prior to rendering of the digital data occurring. And if compression techniques are used, then decompression must also take place, potentially along with encryption, before the digital data is available for rendering. In conventional reproduction processes, the decryption, decompression and rendering are performed in a sequential manner on each packet. In the context of a digital video reproduction, each packet is typically one frame that is received. The entire process on that packet must be complete before a subsequent packet can be operated upon.

Accordingly, if the reproduction process becomes overly complex, the process of operating upon a particular packet of digital data may not been completed prior to a subsequent packet being received. In such case, that subsequent packet would be dropped, resulting in some type of undesired "blip" in the perceived event.

It would be, therefore, desirable to implement methods and systems that could more readily reproduce streamed transmissions of encrypted and compressed digital data, as well as further secure the transmission of such digital data.

SUMMARY OF THE INVENTION

It is an object of the present invention to provide methods and apparatus that can readily reproduce streamed transmissions of encrypted digital data that may or may not also be encoded with some type of compression routine.

It is a further object of the present invention to provide methods and apparatus that allow for the further securing of the transmission of encrypted digital data.

The above objects, and others, whether taken singly or in combination, are achieved by different methods and apparatus, including, but not limited to, certain methods and apparatus for transmission, and other methods and apparatus for reception, as well as a combination of both.

One method according to the present invention of producing a stream of digital data requires determination of a plurality of portions within the stream of digital data, such that a portion of the stream of digital data is encrypted with an encryption key that is capable of being decrypted by a decryption key and the portion includes another decryption key capable of decrypting a subsequent portion of the stream of digital data. A subsequent portion of the stream of digital data is encrypted with another encryption key that is capable of being decrypted by the another decryption key. As so encrypted, the stream of digital data is transmitted, including the portion and the subsequent portion.

A method of decrypting a stream of digital data includes receiving a portion of the stream digital data, the first portion being encrypted with an encryption key capable of being decrypted by a decryption key and including a subsequent decryption key capable of decrypting a subsequent portion of the stream of packets of digital data. The portion of the stream of digital data is then decrypted using the decryption key. The subsequent decryption key disposed within the portion of the stream of digital data is then identified prior to completion of decrypting the portion of the stream of digital data and then installed prior to completion of decrypting the portion of the stream of digital data. And another portion of the stream of packets of digital data is then received and decrypted using a subsequent decryption key, with the another portion being encrypted with another encryption key that is capable of being decrypted by the subsequent decryption key.

Other methods and apparatus are described as set forth herein.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout several views and wherein:

FIG. 3 illustrates a block diagram of the server and, in particular, the various software modules used for the encoding and encryption operations according to the present invention, and their relationship with conventional server software modules;

FIG. 4 illustrates a block diagram of the end-user computer and, in particular, the various software modules used for the decoding, decryption and rendering operations according to the present invention, and their relationship with conventional end-user computer software modules.

DETAILED DESCRIPTION OF THE PREFERRED EMBODIMENTS

In accordance with the present invention, a stream of digital data is described as being transmitted in the preferred embodiment from a server to a remotely located end-user computer. While described in such terms, it is understood that transfers from a remotely located-end user computer to a server, or between other devices, is contemplated and being within the scope of the present invention. And the present invention will have many potential applications, such as, for exemplary purposes only, applications that perform routing, offsite data storage, movie or audio distribution, pay-per view programming, or transmission of data between sources, such as between an automated teller machine and a computer of their owner bank.

It is understood, however, that a stream of digital data can also be transmitted to a remotely located end-user computer from locations other than a server, such as a local CD or other memory storage device. Transmission from a server is nonetheless preferred, since, as described herein, the decryption keys can be retained with greater security than if the digital data is stored in an encrypted form on a CD or other storage device, since in many situations it may be required to store the decryption keys on the CD or other storage device. While it is possible to designate as "bad tracks" locations which store the decryption keys, that is nonetheless not as secure as having them stored more securely on a server preferably maintained in a high security area.

Figure 1:
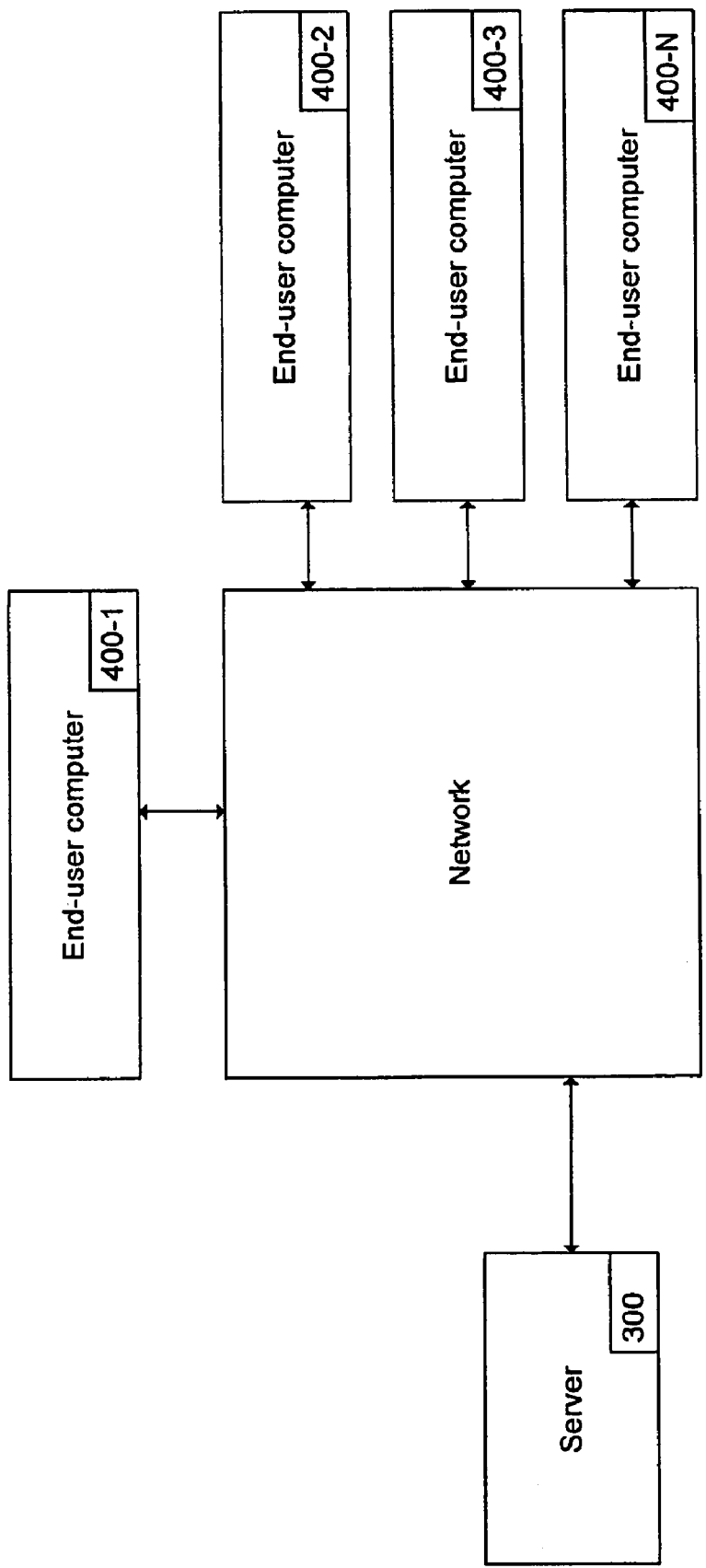
FIG. 1 illustrates an overview of the overall system according to the present invention.

As shown in FIG. 1, according to the present invention, a stream of digital data can be provided from a server 300 to a number of end-user client computers 400-1 to 400-n, particularly over a network such as the Internet or a company Intranet. And a wired network has particular advantages in the context of the present invention, although that is not necessarily needed. As with conventional streaming applications, a sequence of data packets make up the stream according to the present invention, with the separate data packets typically being ordered in some relationship with respect to each other. In a digital movie, for instance, that order relates to temporal sequence of frames required for proper reproduction of the movie content.

It should be noted that the present invention operates at a level that is on top of the transport layer protocol, such as TCP/IP or VPN. Accordingly, operations taking place at this level need not be further described.

In operation, as is known, a user will initially be required to pre-install certain decryption software, as well as software modules that will link with the decoder that will be transmitted with the initial portion of the digital data stream, as described further hereinafter.

The decryption software, as is known, is operable to decrypt an incoming encrypted data stream based upon a decryption key associated which must become known to the decryption software. According to the present invention, it is not the encryption/decryption software that is novel, since many different types of encryption/decryption software can be used, as described herein, but a particularly advantageous feature of the present invention is the manner in which decryption keys are used and where they are located, as will be described further hereinafter.

The software modules that will link with the decoder are also conventional, and, as is conventional practice, are preferably Java based modules that are programmed to install the transmitted software-based decoder, and then allow for the operation, through running the executable file that makes up the decoder, as described hereinafter. It is also noted that while the preferred embodiment contemplates the usage of data encoded by an encoder, which is then subsequently decoded by a decoder, as described herein, that the invention can be practiced without data having been encoded and thus requiring decoding.

Figure 2:
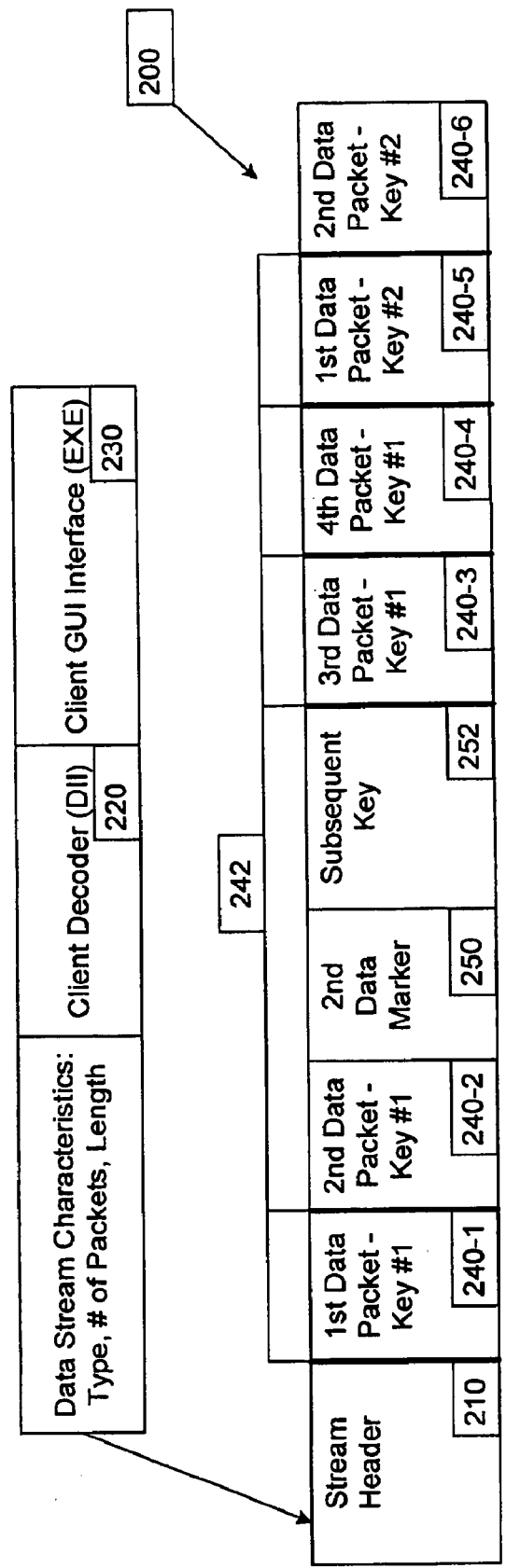
FIGS. 2A and 2B illustrate diagrams of a streams used in accordance with the present invention.
Figure 5A:
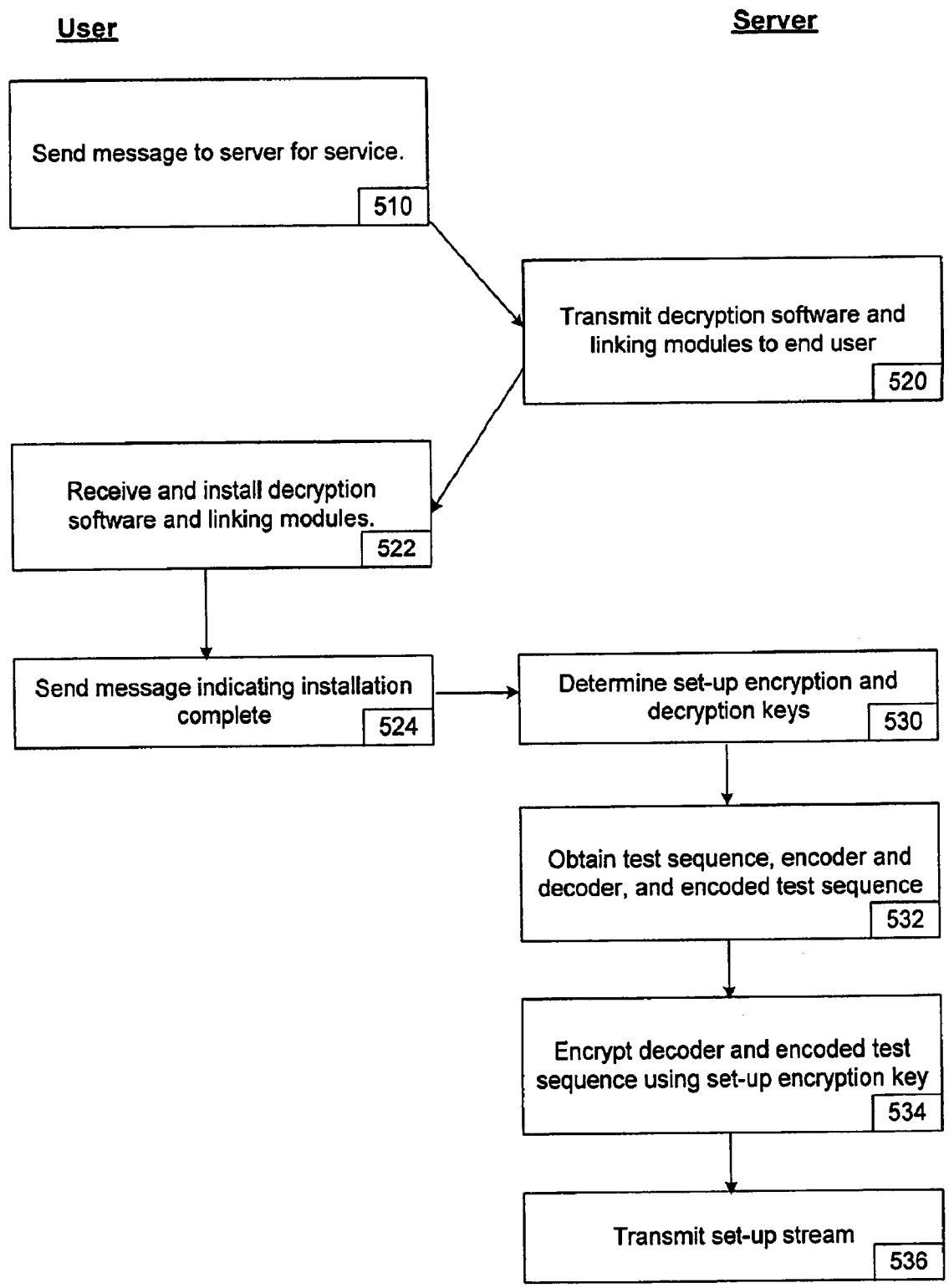
FIGS. 5A–5E illustrate flow charts of the processes according to the present invention.
Figure 5B:
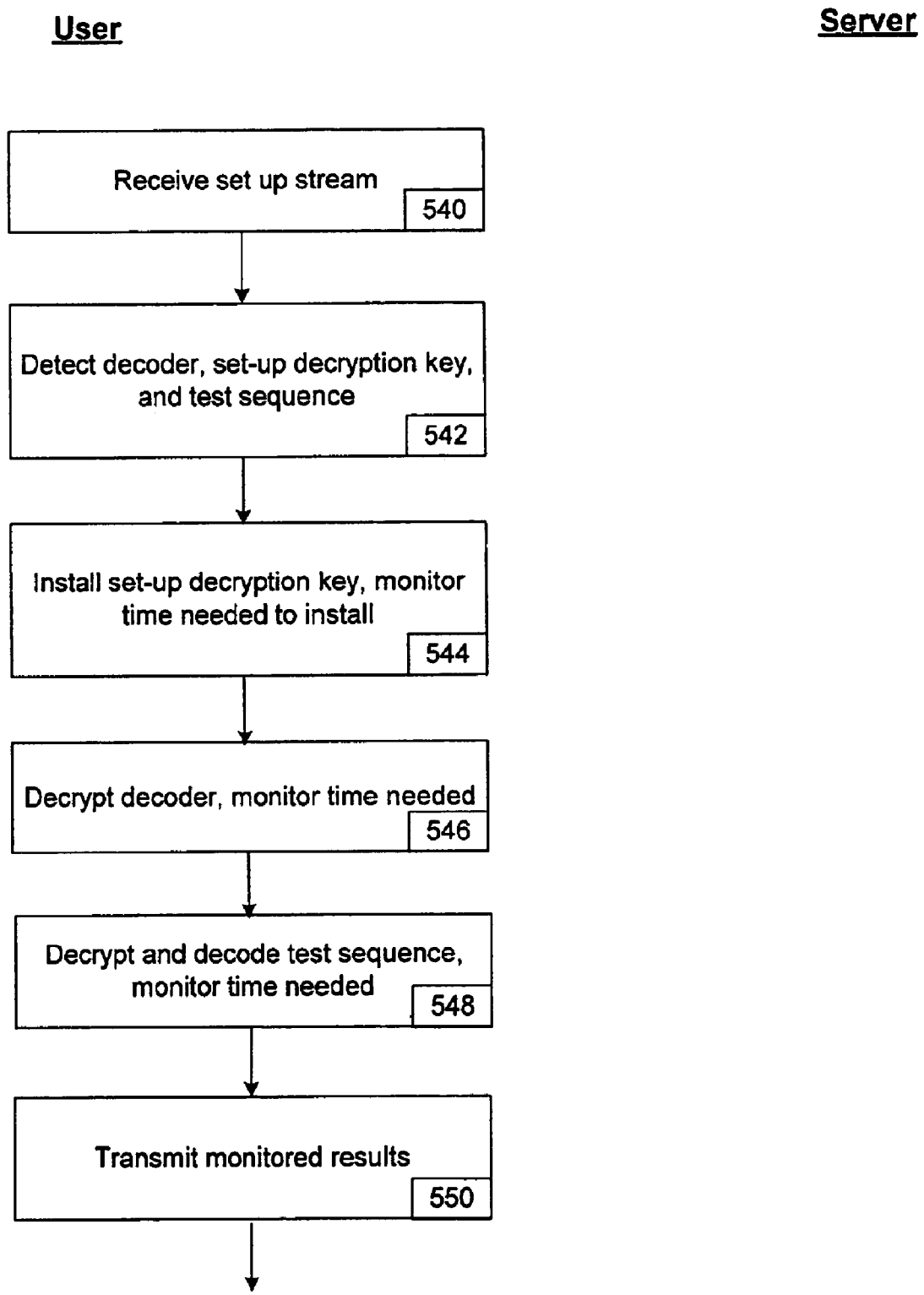
Figure 5C:
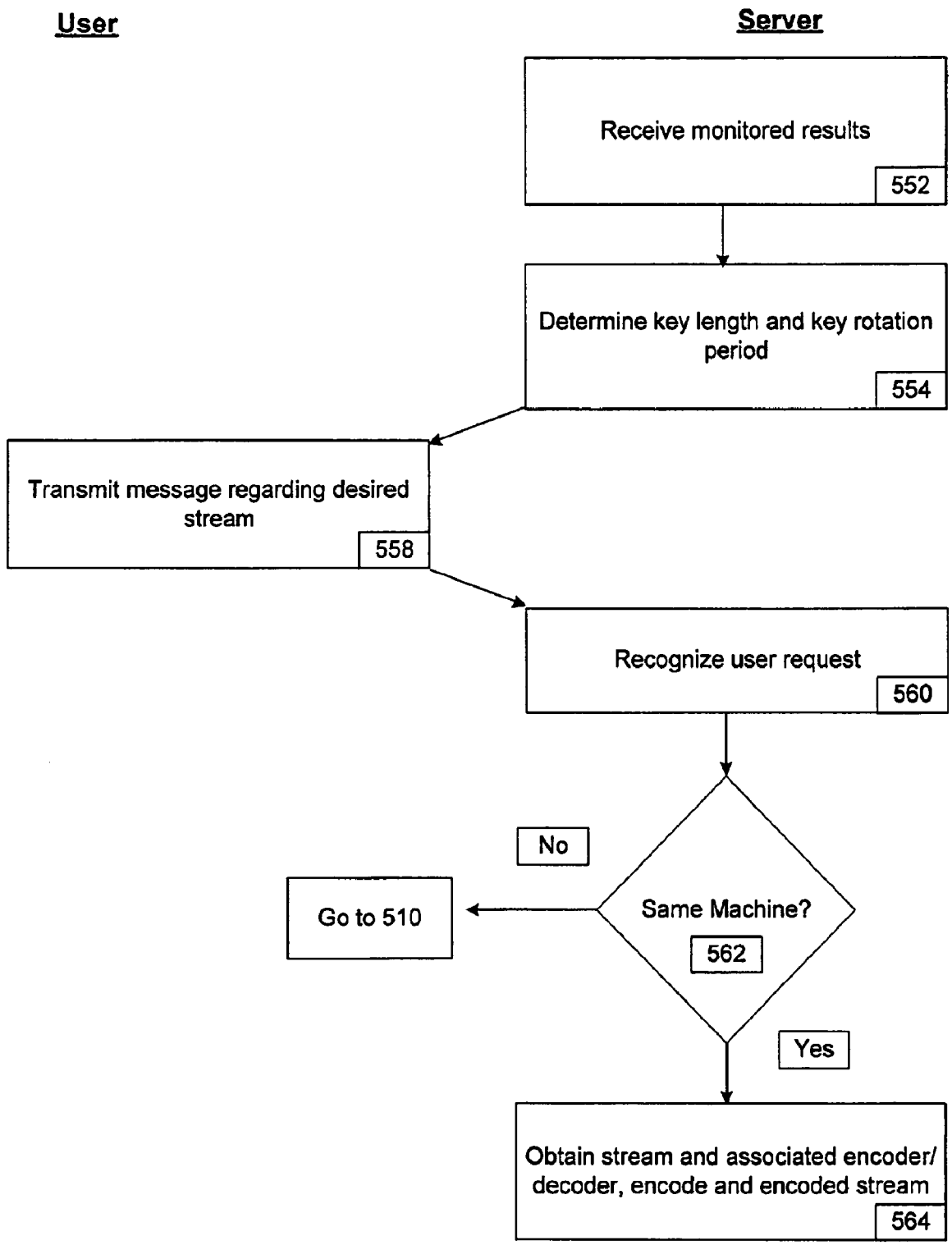
Figure 5D:
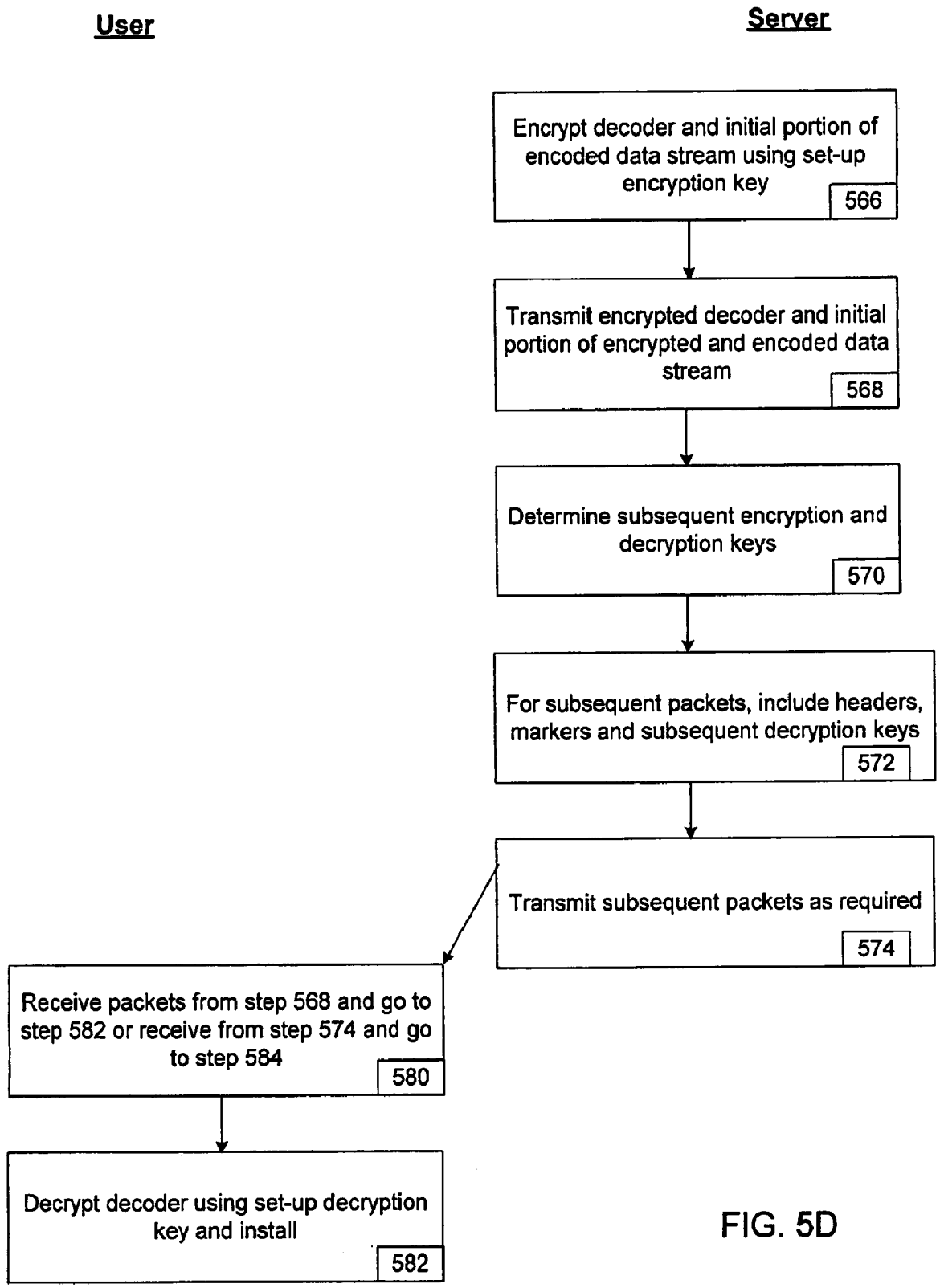
Figure 5E:
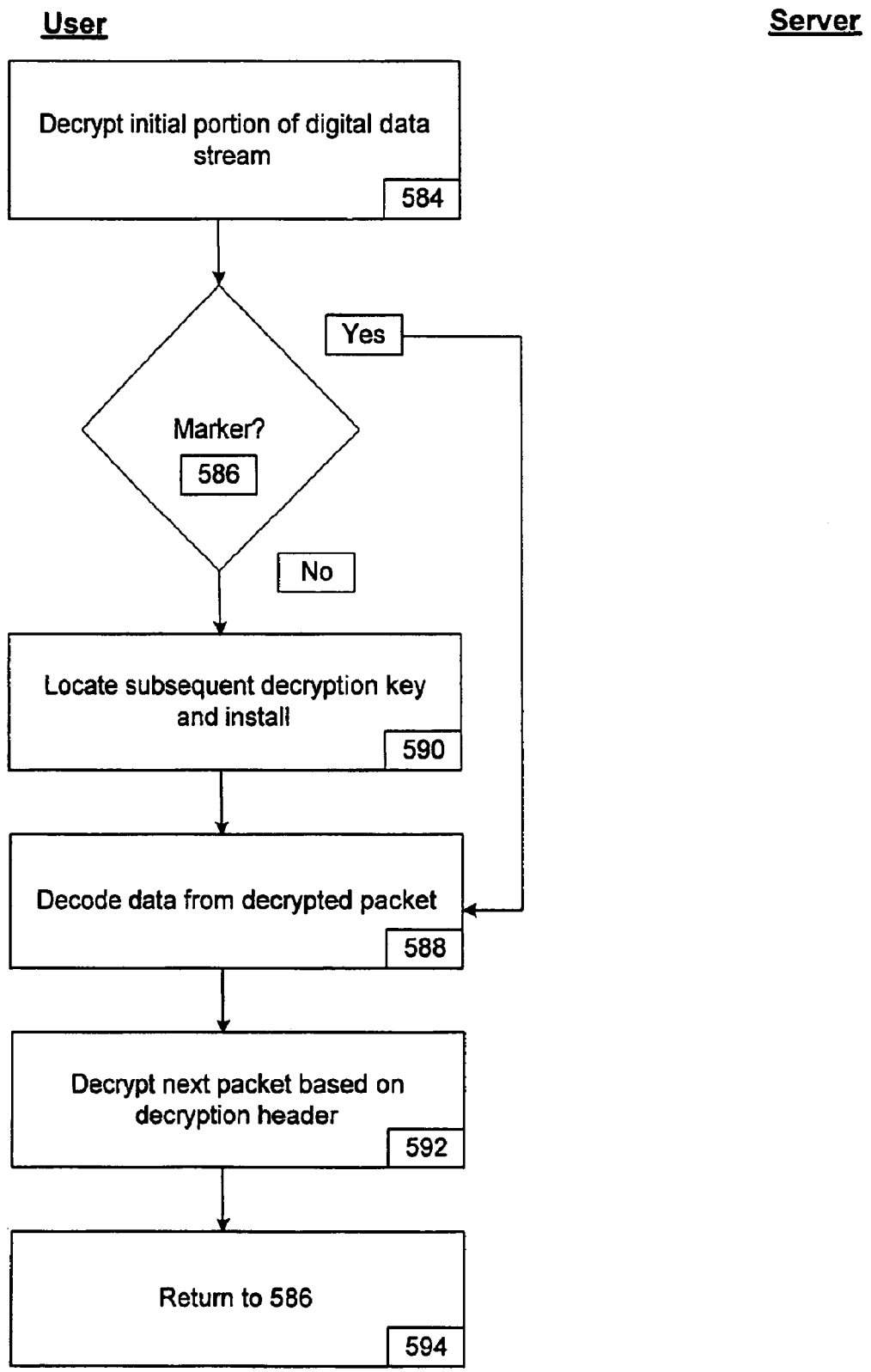

FIG. 2A illustrates a set-up stream 190 that precedes the digital data stream 200, and exemplary portions of the digital data stream 200 are illustrated in FIG. 2B.

The initial set-up stream 190 includes a set-up decryption key 192, an encrypted test decoder 194, and a test data sequence 196. The set-up decryption key 192 has a corresponding set-up encryption key (not shown) used to encrypt the test data sequence 196, and preferably these have a short length, such as 20 bits, which will allow lower performance end-user computers to process the test data sequence 196. The test data sequence 196 is a predetermined sequence of encrypted data that is used to test the end-user computer's 400 ability to decrypt the received data. This test data sequence 196 is preferably of a fixed length and includes a corresponding test decryption key. The time that the end-user computer 400 requires to install the test decryption key 192, decrypt the test decoder 194, and decrypt and decode the test data sequence 196, will each be monitored and used to obtain a monitor information that indicates the performance of that end-user computer, which is then communicated to the server 100 and used in determining how to encrypt the data packets 240, as will be described further hereinafter. The time that the end-user computer 400 requires to install the test decryption key 192 can also be part of the monitor information, and will provide a latency measurement indicating the amount of time required to decrypt and install the decryption key.

The digital data stream 200 preferably contains a header portion 210 that includes a data stream characteristic portion 212 that identifies the type of stream (such as MPEG, MP# or WINZIP, and the number of packets in stream, the decoder 220, which decoder is capable of decoding the data packets 240-1, 240-2 . . . 240-n within the digital data stream 200, and the GUI interface 230, which, as is known, allows for the application as described herein to interface with the operating system of the end-user computer 400. While this exemplary stream 200 is described in the context of a digital movie containing both audio and video information, it is understood that the present invention can be applied to other types of streams, as noted above.

Also disposed within the digital data stream 200 are markers 250 that identify a subsequent decryption keys 252 that follow immediately thereafter. The subsequent decryption keys 252 each have a corresponding subsequent encryption key and will have a corresponding key length, such that the encryption key and corresponding decryption key will change to operate upon the same corresponding data. This key length is determined based upon factors such as the desired level of security, export restrictions, and typical processing power, and can thus vary considerably, such as from 20 to 256 bits, or higher.

In one specific aspect of the present invention, the length of the subsequent decryption keys 252 can vary, either during the transmission of a single digital data stream 200, or during the transmission of various digital data streams 200. One advantage of using different length keys is that the key length can be varied depending upon the performance characteristics of a particular end-user client computers 400. Thus, if the performance of the particular end-user client computer 400 is lower, then a shorter subsequent decryption key length is preferably used, such that for the performance that the particular end-user computer 400 can provide, the decryption can take place at the rate needed, since, as is known, for a longer the key length, more processing is required. For example, while a powerful Pentium® based computer may be able to use a maximum of 256 bits, and thus have the key length vary between 128 and 256 bits, a less powerful 386® computer may be able to use a maximum of 40 bits, and thus have the key length vary between 20 and 40 bits.

And, with respect to this same aspect, if a shorter key length is used, it is preferable to rotate to a new key more frequently. Rotation of keys is preferably based upon the number of bits transmitted before another key is transmitted. Thus, for shorter key lengths, the keys are rotated more often than for longer key lengths, with the choice of key lengths and rotation periods being determined based upon the relative level of security desired, with the more key rotations and longer key lengths offering greater security.

Further description regarding the encryption and decryption keys is not believed necessary.

The decoder 220 decodes the data within the packets 240 that contains the content recognized by the decoder. The decoder 220 can be, for example, an MPEG decoder in the case of video, an MP3 decoder in the case of audio, a GIF decoder in the case of still images, or a WINZIP encoder in the case of data, as well as other decoders. The specific type of decoder is not, however, significant with respect to the present invention, since no matter what manner the data packets 240 are encoded, the decoder will perform a corresponding decode operation, as is known.

Also shown are the data packets 240-1, 240-2 . . . 24-n. In each data packet 240, in a data packet header portion 242, is an unencrypted bit sequence, preferably two bits, identifying the decryption key to be used. This identifies whether the current decryption key or the subsequent decryption key will be used when decrypting that packet 240, as will be described further hereinafter. The data that is encoded and encrypted relates to the content of the stream 200, and is otherwise conventional except as described with respect to the inclusion of markers 250 and subsequent keys 252, as described hereinafter.

As mentioned, in certain of the data packets, a marker 250, of preferably four bits, is inserted into the data packet at some arbitrary location. This marker 250 is a predetermined bit sequence which will not otherwise occur in the unencrypted digital data, which does not have any characteristics that are similar to the data that the marker 250 is disposed within. This marker 250, as described further hereinafter, is used to identify that the next string of data, having a bit-length corresponding to the length of the decryption key, will be the subsequent decryption key 252 so that the end-user computer 400 can recognize the subsequent decryption key. While the location of the marker 250 and subsequent decryption key 252 is arbitrary, it is noted that the marker 250 and subsequent decryption key 252 is preferably located in a position relative to the later-received packet 240 that will be decrypted using this subsequent key 252, so that end-user computer 400, as described hereinafter, has sufficient time to ready itself to actually decrypt the later-received packet 240 using the subsequent key 252.

From the above description, it will be apparent that one aspect of the present invention is the usage of different decryption keys for decrypting various portions of the data stream. In another aspect, the multiple keys are not resident on the end-user computer 110, but are resident at some other location, whether that is a server 100, which is preferred, or a CD, as described above. Furthermore, it is preferable to use a real-time encrypting operation as described herein, which can thereby take into consideration the processing capabilities of the end-user computer 400, although it is apparent that many aspects of the present invention could be implemented if the encryption were preprocessed. In a further aspect, subsequent keys can be transmitted at arbitrary locations. Real-time encoding can also be performed.

The server 300 includes conventional server hardware components, such as a processor, memory, interface chips and the like. Similarly, the server 300 can operate using a conventional operating system such as Windows, Linux, or embedded operating systems, along with conventional software applications, such as streaming video or IP telephony. An illustration of the various layers of conventional software that are typically present on a server 300 that will use the present invention is shown in FIG. 3 to assist in explaining that the application program implementing the present invention from the server 300, as described herein, can be implemented using calls to conventional software.

The end-user computer 400 includes conventional computer hardware components, such as a microprocessor, memory, interface chips and the like. An illustration of the various layers of conventional software that are typically present on a end user computer 400 that will use the present invention is shown in FIG. 4 to assist in explaining that the application program implementing the present invention from the end user computer 400, as described herein, can be implemented using calls to conventional software. The end-user computer 400 can operate using a conventional operating system, such as Windows, Linux or embedded operating systems, along with conventional software applications. Having particular pertinence to the present invention are software applications that allow for an end-user to transmit and receive data in accordance with an established protocol, such as TCP/IP, as noted above. The present invention is thus able to hook into and thus communicate with such software applications, using known techniques, in order to operate in conjunction with such software applications.

The present invention includes software modules that are preferably Java compliant and allow for the various modules to interact, in a manner as will be described herein. Within the end-user computer, a native decoder module will be pre-installed by a user in a conventional manner. The native decoder module includes the hooks into other programs that allows the present invention to communicate with other software programs, as noted above and is known.

Still furthermore, in any end-user computer 400, a certain portion of the random-access memory is used for program instructions, and another portion is used for associated data. According to the present invention, set-up decryption key 192 and each of the subsequent decryption keys 252, described previously, are preferably assigned to different memory locations, such that a different address is used for the storage of each. Thus, once a key has been used for decrypting a portion of the data, the pointer between the decoder and that key is removed, such that the subsequent key is effectively destroyed.

FIG. 5 illustrates a flow diagram of operations performed by the server 300 and the end-user computer 400 in a preferred embodiment of the invention, when executing the program instructions associated with the operations described herein using the software modules described above by the present invention, in order to implement the present invention and create a decrypted and decoded data stream 440, that can be output for further use, as is known. While this is the presently preferred embodiment, it is noted that many of the steps can occur in a different manner or sequence than as described, particularly those steps relating to set-up operations, since the particulars of the set-up operation will also be influenced by the particular application being performed.

Initially, as shown by step 510 in FIG. 5, the user will send a message to server 300 requesting service. In that message, which can be an HTML message, for example, it is preferable to include identifying information, such as name, address, billing information, credit card number and the like. Also, within that message will be the TCP/IP or other network address that corresponds to the end user computer 400 that will communicate with the server 300.

As shown by step 520, the server, upon receipt of the message in step 510, will process the request and will then transmit decryption software and linking modules, as described above, to that end user computer 400.

The end user computer 400, as shown by step 522, will receive decryption software and linking modules transmitted during step 520 and install them. Preferably, end-user computer 400 then send a message indicating to the server in step 524 indicating that this installation was successful.

Thereafter, the server 300, in step 530, will determine the set-up encryption key and corresponding set-up decryption key 192, based upon the identifying data of the user. And, as shown in step 532, will obtain a determined test sequence 196, which may be pre-encoded, and the corresponding test-sequence encoder and test sequence decoder 194. That test sequence and the test sequence decoder 194 will then, in step 534, be encrypted using encryption set-up key. Server 300 will thereafter, in step 536, transmit the unencrypted set-up decryption key 192 the encrypted decoder 194, and the encrypted and encoded test sequence 196 as set-up stream 190.

The end user computer 400 will then, as shown in step 540, receive the set up stream 190. Then, as shown in step 542, it will detect the unencrypted decryption key 192, and the decrypted decoder 194 and set-up test sequence 196, in a manner that is conventional. Step 544 follows, and the end user computer 400 will then install the set-up decryption key 192, monitoring the time needed perform the installation. Thereafter, the end user computer 400 will, in step 546, decrypt the decoder 194 using the set-up decryption key, and monitor the time taken. Step 548 follow, and end user computer 400 will decrypt and decode the test sequence 196, similarly monitoring the time needed to do this. An in step 550, the end user computer 400 will transmit the results of the decoder installation and operations as described on the test sequence to the server 300.

Thereafter, server 300 will, in step 552, receive the test sequence results and, as shown by step 554, use these results to determine the maximum key length and key rotation period that should be associated with this particular end-user computer 400, using the criteria as described above.

Server 300 will associate this maximum key length and key rotation period with the particular end-user computer 400 and store this information for usage when the end user desires to obtain a stream of digital data 200. When that occurs, the end user will transmit a message via an end-user computer 400 to the server 300 requesting a specific stream of digital data, as shown by step 558. In step 560, the server recognizes the user and the request, and then in step 562 checks to see if the requests is from the same computer as the computer that for which the key length and key rotation period has been determined. If so then step 564 follows. If not, then the key length and key rotation must be recomputed, and the user is directed back to step 510, although information already stored will preferably not need to be entered again.

In step 564, the server accesses the digital data stream from the request as well as the associated encoder and decoder, and will then use the encoder to encode the stream.

Of course, the encoding may already have been performed, in which case only the encoded digital data stream and the associated decoder will need to be accessed. maximum key length and key rotation period. Step 566 follows, where the server 300, encrypts the decoder and an initial portion of encoded data stream using set-up encryption key. This is then transmitted in step 568 from the server 300 to the end-user computer 400. The server will also determine, as shown by step 570, the subsequent encryption and decryption keys, based upon the previously determined maximum key length and key rotation period. And in step 572, the server, using the determined encryption keys, will encrypt the remainder of the digital data stream, and insert headers 242, markers 250, and the encrypted subsequent decryption keys 252 as appropriate. Step 574 then illustrates transmitting these subsequent packets as required.

The end user computer 400 will then receive the transmitted portions of the digital data 200, from either the transmissions from step 568, in which case step 582 will follow, or, if received from step 574, then go to step 584. In step 582, the encrypted decoder is decrypted using the set-up decryption key 192, and the unencrypted decoder is installed. In step 584, the initial portion of the digital data stream 200 is decrypted. After decryption, decision step 586 follows, and the end-user computer searches for a marker within the packets of data, once that packet has been decrypted.

As shown by 586 if no marker 250 is found, then step 588 follows and the data therein is decoded using the decoder. Once decrypted and decoded, the data can then be used as it is intended and as is conventionally known, such as for both audio and video presentation in the case of a video.

If, however, a marker 250 is found in step 586, then step 590 follows. In step 590, the marker 250 is located, the number of bits corresponding to a subsequent decryption key are located in order to obtain the subsequent decryption key, and that subsequent decryption key is then installed. Preferably in parallel with the operation of step 590, step 586 is performed on the data that needs to be decoded.

Once the data has been decoded for the packet as a result of step 586, the end-user computer 400 will await a subsequently transmitted packet from the server 300. As shown by step 592, when received, a subsequently transmitted data packet is decrypted based upon the header information. If the header information specifies the set-up decryption key, then that will be used, or, if the header information specifies a subsequent decryption key, then that will be used. Thus, for the first packet that is received with the first subsequent decryption key, then that packet will be decrypted using the subsequent decryption key, rather than the set-up decryption key that had been used on the previous packet.

Thereafter, the process repeats from step 586, with the end-user computer searching for a marker within the decrypted data that has been transmitted.

Although the present invention has been described in detail with reference to the preferred embodiments thereof, those skilled in the art will appreciate that various substitutions and modifications can be made to the examples described herein while remaining within the spirit and scope of the invention as defined in the appended claims.

I claim:

1. A method of producing a stream of digital data comprising the step of:
   determining a plurality of portions within the stream of digital data, such that
   a portion of the stream of digital data is encrypted with an encryption key that is capable of being decrypted by a decryption key and the portion including therein another decryption key capable of decrypting a subsequent portion of the stream of digital data wherein data identifying the location of the another decryption key is in a location other than as part of the encryption key, and
   the subsequent portion of the stream of digital data is encrypted with another encryption key that is capable of being decrypted by the another decryption key; and
   transmitting the stream of digital data, including the portion and the subsequent portion.

2. A method according to claim 1 wherein the portion and a plurality of subsequent portions comprise the plurality of portions, and each of the plurality of subsequent portions is encrypted with a corresponding another encryption key, and within each of the plurality of subsequent portions, except a last subsequent portion, there is included therein a corresponding another decryption key capable of decrypting the corresponding subsequent portion of the stream of digital data.

3. A method according to claim 2 wherein the encryption key and each another encryption key is different and the decryption key and each another decryption key is correspondingly different.

4. A method according to claim 3 wherein each encryption key, each another encryption key, each decryption key and each decryption key have a same key length.

5. A method according to claim 3 wherein the encryption key and decryption key certain ones of the another encryption keys and another decryption keys have a different key length.

6. A method according to claim 2 wherein the decryption key and each another decryption key is located at a different location within each portion.

7. A method according to claim 2 wherein each portion has a different bit size.

8. A method according to claim 2 wherein the plurality of portions are transmitted in an order corresponding to a playback sequence.

9. A method according to claim 8 wherein the encryption key and each another encryption key is different and the decryption key and each another decryption key is correspondingly different.

10. A method according to claim 9 wherein each of the portions contains a plurality of packets, and each of the packets contains a non-encrypted header identifying which decryption key to use to decrypt that packet.

11. A method according to claim 2 further including a marker that immediately precedes the decryption key and each another decryption key to allow identification of each another decryption key within the portion and subsequent portions, respectively.

12. A method according to claim 11 wherein each marker and the corresponding decryption key or another decryption key is encrypted in the same manner as the portion in which it is contained.

13. A method according to claim 1 wherein the another decryption key is encrypted with the encryption key.

14. A method according to claim 13 wherein the plurality of portions are transmitted in an order corresponding to a playback sequence.

15. A method according to claim 13 wherein the encryption key and each another encryption key is different and the decryption key and each another decryption key is correspondingly different.

16. A method according to claim 14 wherein each of the portions contains a plurality of packets, and each of the packets contains a non-encrypted header identifying which decryption key to use to decrypt that packet.

17. A method according to claim 16 further including a marker that immediately precedes the decryption key and each another decryption key to allow identification of each another decryption key within the portion and subsequent portions, respectively.

18. A method according to claim 17 wherein each marker and the corresponding decryption key or another decryption key is encrypted in the same manner as the portion in which it is contained.

19. A method according to claim 1 further including a marker that immediately precedes the another decryption key to allow identification of the another decryption key within the portion.

20. A method according to claim 19 wherein the marker and the another decryption key is encrypted with the encryption key.

21. A method according to claim 20 wherein each encryption key is different and each decryption key is correspondingly different.

22. A method according to claim 21 wherein the corresponding decryption key in each different portion is not located at a same part of the portion.

23. A method according to claim 22 wherein each portion has a different size.

24. A method according to claim 22 wherein the plurality of portions are transmitted in an order corresponding to a playback sequence.

25. A method according to claim 19 wherein each of the portions contains a plurality of packets, and each of the packets contains a non-encrypted header identifying which decryption key to use to decrypt that packet.

26. A method according to claim 1 further including, prior to the step of transmitting the stream of digital data, the steps of:
    transmitting a decryption key that is capable of decrypting the portion of the stream of digital data; and
    receiving an acknowledgement indicating that the decryption key has been properly installed on an end-user computer that will receive the transmitted stream of digital data.

27. A method according to claim 1 further including, prior to step of transmitting the stream of digital data, the steps of:
    transmitting a set-up stream including an encrypted test decoder and an encrypted and encoded test sequence; and
    receiving an acknowledgement with monitor information indicative of performance of an end-user computer; and
    determining a key length and a key rotation period based upon the monitor information.

28. A method according to claim 27 wherein the monitor information provides an amount of time required to decrypt and install the decryption key and decrypt and decode the test sequence.

29. A method according to claim 26 wherein, an encrypted executable decoder is included in the portion of the stream of digital data, the encrypted executable decoder, when decrypted and installed, being capable of decoding data content that is also included in the portion of the stream of digital data.

30. A method according to claim 29 wherein the encrypted executable decoder can be decrypted using the decryption key.

31. A method according to claim 26 wherein the portion and a plurality of subsequent portions comprise the plurality of portions, and each of the plurality of subsequent portions is encrypted with a corresponding another encryption key, and within each of the plurality of subsequent portions, except a last subsequent portion, there is including therein a corresponding another decryption key capable of decrypting the corresponding subsequent portion of the stream of digital data.

32. A method according to claim 31 wherein
    the another decryption key is located within the portion at a location that precedes the end the portion by an amount that will ensure the remaining transmission time of the portion after transmission of the another decryption key is greater than a latency measurement indicating an amount of tune required to decrypt and install the decryption key; and
    each another decryption key is located within each subsequent portion at another location that precedes the end the subsequent portion by another amount that will ensure the remaining transmission time of that subsequent portion after transmission of the corresponding another decryption key is greater than the latency measurement.

33. A method according to claim 31 wherein each encryption key is different and each decryption key is correspondingly different.

34. A method according to claim 33 wherein each encryption key, each another encryption key, each decryption key and each decryption key have a same key length.

35. A method according to claim 33 wherein the encryption key and decryption key and certain ones of the another encryption keys and another decryption keys have a different key length.

36. A method according to claim 31 wherein each portion has a different bit size.

37. A method according to claim 31 wherein the plurality of portions are transmitted in an order corresponding to a playback sequence.

38. A method according to claim 31 wherein each of the portions contains a plurality of packets, and each of the packets contains a non-encrypted header identifying which decryption key to use to decrypt that packet.

39. A method according to claim 38 further including a marker that immediately precedes the decryption key and each another decryption key to allow identification of each another decryption key within the portion and subsequent portions, respectively.

40. A method according to claim 39 wherein the each marker and the corresponding decryption key or another decryption key is encrypted in the same manner as the portion in which it is contained.

41. A method according to claim 26 wherein the another decryption key is encrypted with the encryption key.

42. A method according to claim 26 further including a marker that immediately precedes the another decryption key to allow identification of the another decryption key within the portion.

43. A method according to claim 42 wherein the marker and the another decryption key is encrypted with the encryption key.

44. A method according to claim 43 wherein the corresponding decryption key in each different portion is not located at a same part of the portion.

45. A method according to claim 44 wherein each portion has a different bit size.

46. A method according to claim 42 wherein the plurality of portions are transmitted in an order corresponding to a playback sequence.

47. A method according to claim 42 wherein each of the portions contains a plurality of packets, and each of the packets contains a non-encrypted header identifying which decryption key to use to decrypt that packet.

48. A method according to claim 1 wherein:
the portion immediately precedes the subsequent portion; and
the another decryption key is located within the portion at a location that precedes the end the portion by an amount that will ensure the remaining transmission time of the portion after transmission of the another decryption key is greater than a period of time needed to decrypt and install the another decryption key.

49. A method according to claim 48 wherein each of the portions contains a plurality of packets, and each of the packets contains a non-encrypted header identifying which decryption key to use to decrypt that packet.

50. A method of decrypting a stream of digital data comprising the steps of:
receiving a portion of the stream digital data, the first portion being encrypted with an encryption key capable of being decrypted by a decryption key and including a subsequent decryption key capable of decrypting a subsequent portion of the stream of packets of digital data;
decrypting the portion of the stream of digital data using the decryption key;
identifying the subsequent decryption key disposed within the portion of the stream of digital data using location data for the subsequent decryption key prior to completion of decrypting the portion of the stream of digital data, wherein the location data is at a location other than as a portion of the encryption key;
installing the subsequent decryption key data prior to completion of decrypting the portion of the stream of digital data; and
receiving another portion of the stream of packets of digital data, the another portion being encrypted with another encryption key that is capable of being decrypted by the subsequent decryption key; and
decrypting the another portion of the stream of digital data using the subsequent decryption key.

51. A method according to claim 50 wherein the portion and the another portion each include a plurality of packets, and each of the packets contains a non-encrypted header identifying that the decryption key and the subsequent decryption key, respectively, should be used during the respective step of decrypting.

52. A method according to claim 51 wherein the step of identifying includes the step of locating a marker that immediately precedes the subsequent decryption key.

53. A method according to claim 52 wherein the step of installing stores the subsequent decryption key at a memory address location that is different from the decryption key.

54. A method according to claim 52 further including additional steps of receiving and decrypting the another portion, and for each additional another portion, there is included
a step of identifying each additional subsequent decryption key; and
a step of installing each additional subsequent decryption key, the step of installing including the step of storing each additional subsequent decryption key at a memory address location that is different from the immediately preceding subsequent decryption key.

55. A method according to claim 54 wherein each memory address location for each additional subsequent decryption key is different.

* * * * *